(12) United States Patent
Burkard

(10) Patent No.: US 7,778,507 B2
(45) Date of Patent: Aug. 17, 2010

(54) LIGHT GUIDE AND METHOD OF PRODUCING A LIGHT GUIDE

(75) Inventor: Klaus Burkard, Regensburg (DE)

(73) Assignee: Osram Gesellschaft mit beschränkter Haftung, Munich (DE)

( * ) Notice: Subject to any disclaimer, the term of this patent is extended or adjusted under 35 U.S.C. 154(b) by 0 days.

(21) Appl. No.: 11/957,684

(22) Filed: Dec. 17, 2007

(65) Prior Publication Data

US 2008/0151554 A1 Jun. 26, 2008

(30) Foreign Application Priority Data

Dec. 20, 2006 (DE) .................... 10 2006 060 409

(51) Int. Cl.
*G02B 6/00* (2006.01)

(52) U.S. Cl. ...................... 385/31; 385/146

(58) Field of Classification Search ............. None
See application file for complete search history.

(56) References Cited

U.S. PATENT DOCUMENTS

| 4,364,640 A | | 12/1982 | Kruger et al. | |
|---|---|---|---|---|
| 4,925,514 A | * | 5/1990 | Okada et al. | 156/249 |
| 5,039,207 A | | 8/1991 | Green | |
| 5,550,676 A | | 8/1996 | Ohe et al. | |
| 5,896,229 A | * | 4/1999 | Rudisill et al. | 359/599 |
| 6,324,011 B1 | * | 11/2001 | Higuchi | 359/627 |
| 7,194,158 B2 | | 3/2007 | Schultheis et al. | |
| 2004/0022050 A1 | * | 2/2004 | Yamashita et al. | 362/31 |
| 2005/0069254 A1 | | 3/2005 | Schultheis et al. | |
| 2005/0237767 A1 | * | 10/2005 | Cheng | 362/615 |
| 2006/0056166 A1 | * | 3/2006 | Yeo et al. | 362/19 |
| 2006/0056791 A1 | | 3/2006 | Tzschoppe | |
| 2006/0268571 A1 | * | 11/2006 | Harada et al. | 362/607 |
| 2008/0037943 A1 | * | 2/2008 | Lee et al. | 385/123 |

FOREIGN PATENT DOCUMENTS

| DE | 44 04 425 | | 8/1995 |
|---|---|---|---|
| DE | 44 32 515 | | 3/1996 |
| DE | 198 60 697 | | 8/2000 |
| DE | 103 36 352 | | 3/2005 |
| EP | 0 500 960 | | 9/1992 |
| JP | 8-279307 A | * | 10/1996 |
| JP | 10-104434 A | * | 4/1998 |
| WO | WO 00/50949 | | 8/2000 |
| WO | WO 2004/015489 | | 2/2004 |
| WO | WO 2004/079418 | | 9/2004 |
| WO | WO 2004/107015 | | 12/2004 |

OTHER PUBLICATIONS

Machine translation of detailed description, JP 8-279307A (published Oct. 22, 1996), retrieved via http://www4.ipdl.inpit.go.jp/Tokujitu/tjsogodben.ipdl?N0000=115.*

* cited by examiner

*Primary Examiner*—Mike Stahl
(74) *Attorney, Agent, or Firm*—Fish & Richardson P.C.

(57) ABSTRACT

A light guide comprising a base body and a plurality of outcoupling elements that are disposed on an outcoupling side of the base body and are provided to couple radiation out of the base body, said outcoupling elements being applied on a film. A method of producing the light guide.

3 Claims, 3 Drawing Sheets

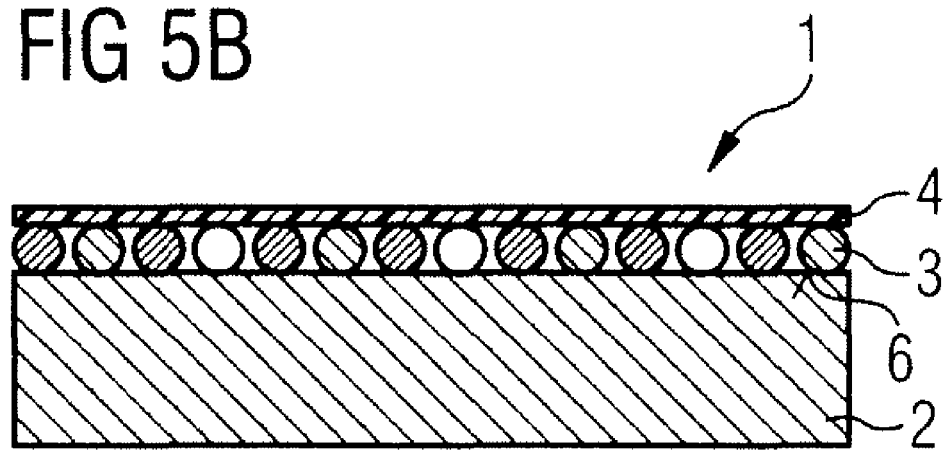
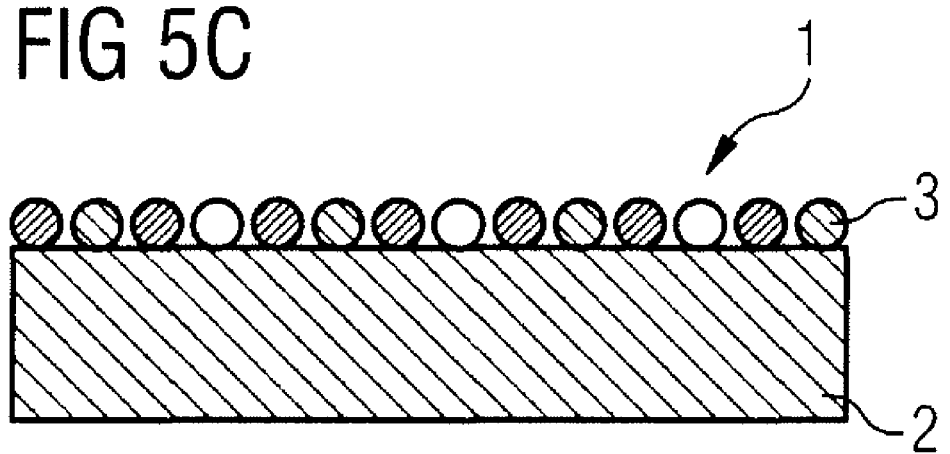

LIGHT GUIDE AND METHOD OF PRODUCING A LIGHT GUIDE

CROSS-REFERENCE TO RELATED APPLICATIONS

This application claims the benefit of a foreign priority application filed in Germany, serial number 10 2006 060 409.1, filed Dec. 20, 2006. The contents of the prior application is hereby incorporated by reference in its entirety.

TECHNICAL FIELD

This disclosure relates to a light guide and a method of producing a light guide.

BACKGROUND

Known from Unexamined Patent Application DE 44 044 25 A1 is a device for the diffuse illumination of transparent surfaces or bodies. To obtain good diffuse illumination even with weak light sources, the device comprises at least one light source that is disposed at a core of the device and sheds light inwardly. A partly transparent layer and an at least partly reflective layer are disposed on the core.

Furthermore, described in Unexamined Patent Application DE 103 36 352 A1 are a light guide and a method of producing light-scattering structures on flat light guides. With these light-scattering structures, which are applied directly to the light guide in a non-impact process, light can be coupled in to render the light-scattering structures visible.

SUMMARY

It is an object of certain embodiments of the present disclosure to specify a light guide comprising outcoupling elements that is simple to produce.

It is an object of certain embodiments of the present disclosure to specify a simple method of producing a light guide.

According to a first embodiment, a light guide comprises a base body and a plurality of outcoupling elements that are disposed on an outcoupling side of the base body and are provided to couple radiation out of the base body, said outcoupling elements being applied on a film. The film advantageously serves as a carrier film to which the outcoupling elements are applied separately from the base body, the film, with the outcoupling elements, subsequently being disposed on the base body.

According to a preferred configuration, a top side of the film that is free of outcoupling elements is oriented facing the base body. This permits flat contact between the film and the base body and thus makes for relatively good adhesion.

According to a particularly preferred configuration, the film is bonded to the base body without the use of adhesive. The film in this case is in direct contact with the base body, there advantageously being no need for any additional adhesive, for example a glue, to affix the film to the base body.

In particular, the film can be affixed to the base body thermomechanically. The film is advantageously warmed before or after being mounted on the base body and is pressed against the base body in the warmed state. Once it has cooled, the film is thermomechanically affixed to the base body.

According to an alternative configuration, a top side of the film, to which the outcoupling elements are applied, is oriented facing the base body. With this configuration, the film advantageously serves to provide improved mechanical and chemical protection of the outcoupling elements, on the one hand, and a smooth surface on an outcoupling side of the light guide, on the other.

According to a second embodiment, the light guide comprises a base body and a plurality of outcoupling elements that are disposed on an outcoupling side of the base body and are provided to couple radiation out of the base body and are transferred to the base body by means of a film, said film being peeled off the outcoupling elements. This advantageously reduces radiation losses that may occur by dissipation when the film is left on the base body.

The outcoupling elements of the light guide are disposed on the base body indirectly, since the outcoupling elements are not printed directly onto the base body, but are first applied to the film and are then transferred to the base body by means of the film.

A light guide of the kind described herein is suitable for conducting monochromatic or polychromatic electromagnetic radiation, preferably in the visible range.

The radiation that is conducted through the light guide enters the base body at a radiation input surface and leaves the base body at a radiation output surface. The radiation output surface can be arranged parallel or perpendicular to the radiation input surface. Both surfaces are part of the outer surface of the base body. In the case of a parallel arrangement of the two surfaces, direct backlighting of the light guide by a radiation source takes place. In the case of a perpendicular arrangement of the two surfaces, lateral incoupling of radiation takes place. The radiation output surface is in particular disposed on the outcoupling side of the light guide. Depending on the configuration, the outcoupling elements can be in direct contact with the radiation output surface or can be spaced apart from the radiation output surface by the film. The light guide can be illuminated for example by a plurality of light-emitting diodes (LEDs).

The geometric shape of the base body is usefully adapted to the use of the light guide. For example, a plate-shaped light guide is especially suitable for backlighting a display device, such as an LCD (liquid crystal display), for example. The base body can, for example, have a thickness of about 10 mm.

The base body is preferably formed from a radiation-transparent material, i.e., a transparent or translucent material. Suitable radiation-transparent materials are, for example, glass, polymethyl methacrylate (PMMA) or polycarbonate (PC).

The light guide is suitable for conducting a bundle of rays, in which case the guidance of the light, particularly when the radiation is coupled in laterally, can take place by total reflection or by normal reflection. In the case of total reflection, the base body has a higher refractive index than a surrounding medium. In the case of normal reflection, a surface of the base body that is intended to perform reflection can be provided with a reflective layer. With lateral incoupling, a rear outer surface of the base body, disposed opposite from the radiation output surface, is preferably mirrorized, so that laterally incoupled radiation is reflected in the direction of the radiation outcoupling surface by the rear reflective layer. With direct backlighting, the rear reflective layer advantageously is no longer necessary, so radiation can be coupled directly into the base body from the rear.

The radiation is preferably coupled out of the base body diffusely by means of the outcoupling elements. The light guide can therefore serve as a diffuser, preferably for the backlighting of display devices. With lateral incoupling of radiation, the outcoupling elements can, by refraction or scattering, reduce the total reflection of radiation at the interface between the base body and the surrounding medium, the radiation being coupled out diffusely via the outcoupling elements. With direct backlighting, the radiation strikes the outcoupling elements directly and is diffusely scattered or refracted.

In certain embodiments, uniform radiation emission can advantageously be obtained with the light guide. This is possible in particular by means of a purposeful arrangement of the outcoupling elements on the base body and associated control of the outcoupling of radiation. The density of the outcoupling elements is preferably adapted to the radiation distribution in the base body. Consequently, when the incoupling of radiation is nonuniform, it is useful for the distribution of the outcoupling elements on the radiation outcoupling surface also to be nonuniform in order ultimately to obtain uniform emission of radiation. With the light guide, the uniformity can be as high as 70% to 80%. This means that the radiation intensity across the irradiated surface varies by no more than 20% to 30%.

According to an advantageous configuration, the radiation is also coupled out diffusely by the film. The film preferably contains a material that diffusely scatters the radiation to be coupled out.

The outcoupling elements are preferably bonded to the base body without the use of adhesives. This advantageously eliminates the need for an adhesive, and thus the need to apply the adhesive. In particular, the outcoupling elements are affixed to the base body thermomechanically. To bring about thermomechanical fixation of the outcoupling elements to the base body, the preferably printed film provided with the outcoupling elements can be warmed before being mounted on the base body and can be pressed against the base body in the warmed state. Once cooled, the outcoupling elements adhere to the base body and thus are thermomechanically fixed.

The outcoupling elements can be flattened. Before the film provided with the outcoupling elements is arranged on the base body, the outcoupling elements are approximately circular in cross section. After fixation, the outcoupling elements can be compressed so that they assume an oval shape and are elongated in a main direction of extent of the base body.

According to a preferred variant, the outcoupling elements are formed from a dried coating material. The coating material can in particular be a liquid that is applied to the film in order to form outcoupling elements and is dried prior to mounting on the base body. The coating material can further be a printing ink containing a solution or suspension of colorants or pigments in a solvent, for example in water.

According to a further preferred variant, the outcoupling elements can be color dots having one of the colors red, green, blue or white. Such a variant of the light guide is particularly suitable for backlighting a display device, for example an LCD. In that case, the mixed-color radiation emitted by the light guide is filtered to produce the basic colors of the pixels. In particular, the various color dots are arranged in a regularly recurring sequence. A relatively uniform intensity distribution can advantageously be achieved for each color in this way.

A method is disclosed for producing a light guide includes the steps of applying outcoupling elements to a film and arranging the film provided with the outcoupling elements on a base body. Particularly suitable for use as the film is a printable carrier film, preferably containing a synthetic material. Any of the common film formats can in principle be used, for example DIN A0 to DIN A8. For backlighting purposes, however, the film size is adapted to the size of the display device, with typical diagonal values of 5" to 24". Analogously, the size of the base body can be adapted to the size of the display device.

According to a preferred variant, the method of applying the outcoupling elements is an ink jet printing process. In this case, a jet of liquid coating material from which the outcoupling elements are formed exits a print head through a nozzle and disintegrates into individual droplets. The outcoupling elements are produced by depositing at least one small dot, preferably a color dot. Unlike a screen printing process, for example, the present ink jet printing process makes it possible to create not only grid-shaped arrangements of the outcoupling elements, but also irregular, arbitrarily complex patterns. In addition, relatively fine structures can be produced with currently available ink jet printers, which have a standard resolution of 1200 or 1440 dpi. This, in turn, can advantageously increase the outcoupling of radiation. Furthermore, the present ink jet printing process facilitates the fast, inexpensive and simple production of a light guide using convenient intermediate goods such as ink jet printers and printer film, the necessary supplies for which are easy to handle and consistently available.

According to a further preferred variant, the film is warmed and pressed onto the base body. The film can be warmed, for example to about 80° C., before being arranged on the base body, and pressed onto the base body in the warmed state. Alternatively, the film can first be arranged on the base body and subsequently for example brought into contact with a heated plate, the film being warmed and pressed onto the base body by contact with the plate.

In an advantageous configuration of the method, the film is mounted on the base body such that a top side of the film that is free of outcoupling elements adheres to the base body. Alternatively, the film can be applied to the base body such that the outcoupling elements adhere to the base body. In the latter case, the film can then be stripped off the outcoupling elements. The advantages of this particular embodiment were noted previously in connection with the various configurations of the light guide and also, naturally, apply to the various method variants.

It should further be pointed out that all the features cited in connection with the various configurations of the light guide are also applicable to the described production method, and vice versa.

Further features, advantages and configurations of a light guide and of a method of producing a light guide will emerge from the exemplary embodiment described in detail hereinafter in conjunction with FIGS. 1 to 5.

DESCRIPTION OF DRAWINGS

FIG. 4 is a schematic representation of various ways of coupling radiation into the light guide and FIGS. 5A, 5B and 5C are a schematic representation of various steps in a method for producing a light guide.

In the exemplary embodiments and figures, like or like-acting elements are provided with the same respective reference designations.

DETAILED DESCRIPTION

Figure 1:
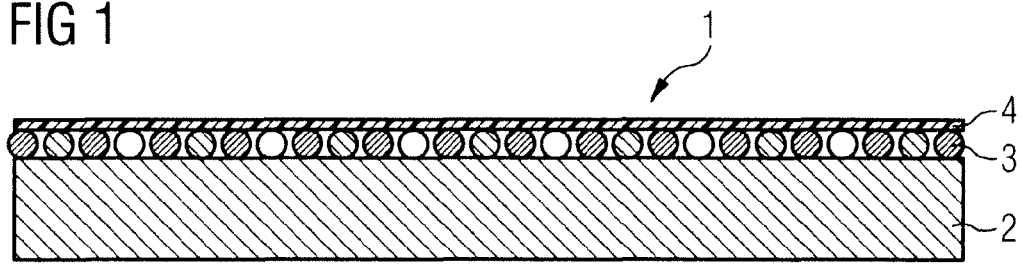
FIG. 1 is a cross-sectional view of a first exemplary embodiment of a light guide.

Illustrated in FIG. 1 is a light guide 1, which comprises a base body 2 and a film 4 provided with outcoupling elements 3. The outcoupling elements 3 are disposed between the base body 2 and the film 4, so the film serves not only to transfer the outcoupling elements 3 to the base body 2, but also as a covering for the outcoupling elements 3. The outcoupling elements 3 thus are advantageously protected mechanically and chemically. Furthermore, due to the evenness of the film, an advantageously smooth surface is formed.

It should be noted that the schematically illustrated outcoupling elements 3 are to be understood as symbolic. FIG. 3B, however, shows one possible shape for the outcoupling elements 3.

The outcoupling elements 3 are preferably color dots that are applied to the film 4 by means of an ink jet printer. The outcoupling elements 3 can exhibit the colors red, green, blue and white alternatingly in a regular sequence. Irregular, more complex patterns, particularly color patterns, are also conceivable, however.

Radiation coupled into the base body 2, which can be coupled in laterally or from the back (see also FIG. 4, radiation A and B), is preferably coupled out of the light guide 1 diffusely by the outcoupling elements 3. This can be done by refraction, particularly if the refractive index of the outcoupling elements 3 is different from that of the base body 2, or by scattering. The diffuse outcoupling can be further improved by means of the film 4, by forming the latter from a diffusely refracting or scattering material. Advantageously, conventional diffuser film (a so-called "diffuser sheet") is superfluous with such a configuration. The light guide 1 fashioned in this manner can advantageously be used as a diffuser for backlighting purposes.

The base body 2 usefully contains a material that is transparent to the incoupled radiation. In particular, the base body 2 contains glass or a synthetic material such as PMMA or PC.

A great advantage of the light guide 1 illustrated in FIG. 1 is the fact that the outcoupling elements 3 are affixed to the base body 2 directly or without the use of adhesive, which means that no intermediate layer is needed in order to place the outcoupling elements 3 on or affix them to the base body 2. The fixation can be brought about in particular via a thermomechanical process, such as that described exemplarily below with reference to FIGS. 5A to 5C, where the film 4 provided with the outcoupling elements 3 is laid on the base body 2 and pressed onto it in the warmed state.

Figure 2:
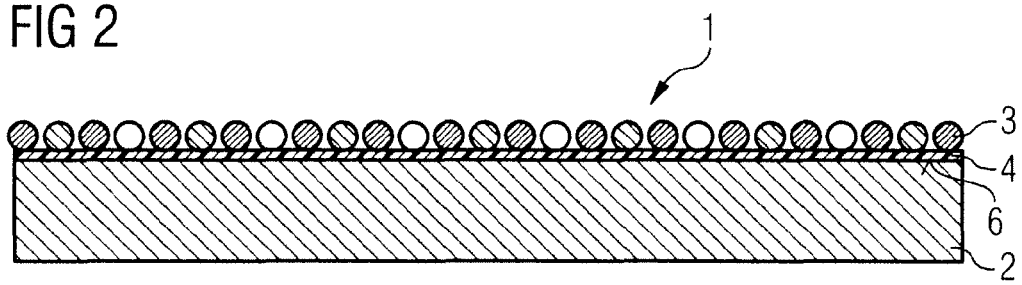
FIG. 2 is a cross-sectional view of a second exemplary embodiment of a light guide.

In the light guide 1 illustrated in FIG. 2, the film 4 is disposed between the outcoupling elements 3 and the base body 2. The surface of the film 4 that is free of outcoupling elements 3 is preferably fully in contact with a radiation outcoupling surface 6 of the base body 2. This arrangement permits unbroken contact of the film 4 with the base body 2 and thereby assures relatively good adhesion. An additional adhesive is not necessary in this exemplary embodiment, as well.

Figure 3A:
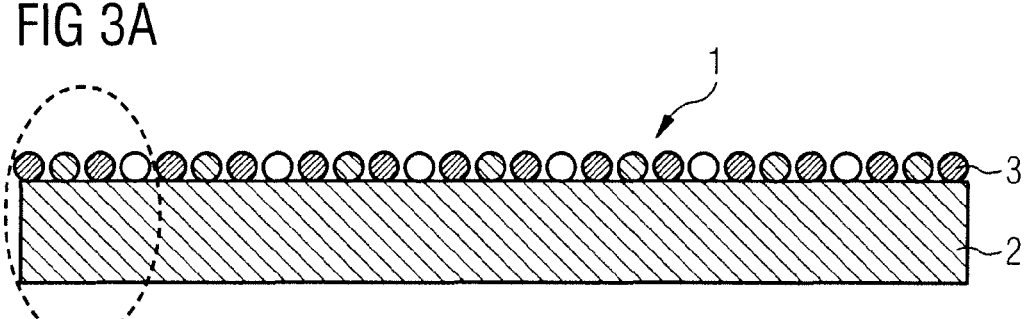
FIG. 3A is a cross-sectional view of a third exemplary embodiment of a light guide and FIG. 3B is an enlarged detail of the light guide depicted in FIG. 3A.
Figure 3B:
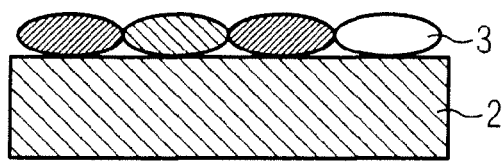

As is apparent from FIG. 3A, the film can be removed in this case, in contrast to that of the exemplary embodiments depicted in FIGS. 1 and 2. Any peeling is preferably done after the thermomechanical fixing of the outcoupling elements 3. Since radiation losses can occur when the film is present, a higher light yield can therefore be obtained when the film is not there.

FIG. 3B shows an enlarged detail of FIG. 3A. The fact that the outcoupling elements 3 have been mounted by means of film can be discerned from the shape of the outcoupling elements 3, for example. The outcoupling elements 3 are deformed by being pressed on, during which process the approximately circular shape of the outcoupling elements 3 in cross section progresses to an oval shape. The outcoupling elements 3 can be characterized as "flattened" in the final light guide 1.

Figure 4:
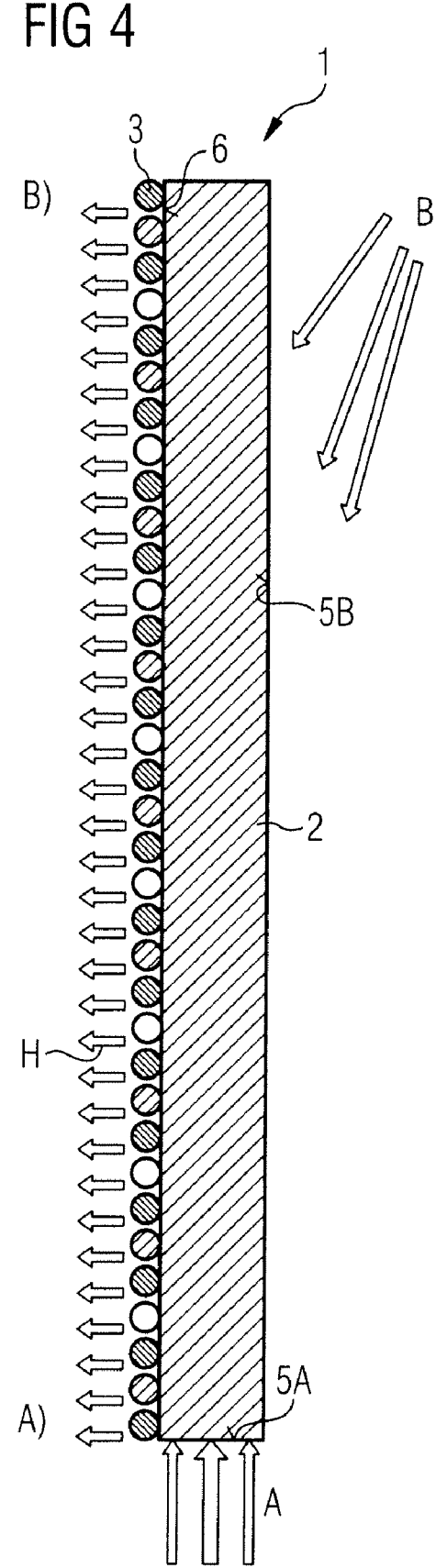

FIG. 4 shows two preferred ways, A) and B), of coupling radiation into the light guide 1. The incoupling can be done from the side, such that the radiation A enters the base body 2 through a radiation input surface 5A extending perpendicularly to the radiation outcoupling surface 6. Alternatively or additionally, the incoupling can take place from the back, such that the radiation B enters the base body 2 through a radiation input surface 5B extending parallel to the radiation outcoupling surface 6.

To obtain uniform radiation emission, as indicated by the arrow H, the distribution of the outcoupling elements 3 on the radiation outcoupling surface 6 is preferably adapted to the illumination of the base body 2. In particular, with nonuniform lateral incoupling of radiation, the density of the outcoupling elements 3 increases from the incoupling side to the opposite side.

In the exemplary embodiment of a method illustrated in FIGS. 5A to 5C, the outcoupling elements 3 are first applied to the film 4 (FIG. 5A). In particular, the film is printed by means of an ink jet printer, the outcoupling elements 3 being made from a liquid coating material that particularly contains colorants dissolved in a solvent. The outcoupling elements 3 are preferably formed from at least one color dot, which reaches the film as a droplet from the nozzle of a printer head. The color dot can have different colors, for example red, green, blue or white, for different outcoupling elements 3.

The film 4 provided with the outcoupling elements 3 is then laid on the base body 2 (FIG. 5B). The outcoupling elements 3 are advantageously already dry at this point, so the outcoupling elements 3 are not smeared during transfer to the base body 2.

The fixation of the outcoupling elements 3 on the radiation outcoupling surface 6 is preferably effected thermomechanically. To this end, the printed film can be warmed before or after being laid on the base body 2 and can be pressed against the base body 2 in the warmed state. In particular, after being laid on the base body 2, the printed film can be covered with a plate warmed to 80° C., for example, thereby warming the printed film and pressing it onto the base body 2. Once cooled, the outcoupling elements 3 are thermomechanically affixed to the base body 2.

As illustrated in FIG. 5C, the film can be peeled off the outcoupling elements 3 as soon as they are affixed to the base body 2.

The outcoupling elements 3 are mounted on the base body 2 indirectly by the method described with reference to FIGS. 5A to 5C. In comparison to the direct method, where the outcoupling structures are written directly onto the base body without the use of a film, the indirect method does not entail the expensive process of adapting the printer to the shape and size of the base body.

The invention is not limited to the exemplary embodiments by the description of it with reference thereto. Rather, the invention encompasses any novel feature and any combination of features, including in particular any combination of features recited in the claims, even if that feature or combination itself is not explicitly mentioned in the claims or exemplary embodiments.

What is claimed is:

1. A method of producing a light guide comprising a preformed base body and a plurality of outcoupling elements, the method comprising:

applying a plurality of outcoupling elements directly to a surface of a film;

arranging said film provided with said outcoupling elements on a pre-formed base body of the light guide;

wherein said film is applied to said pre-formed base body without the use of an adhesive such that a surface of said film that is free of outcoupling elements adheres to said pre-formed base body.

2. The method as in claim 1, wherein the method for applying said outcoupling elements is an ink jet printing process.

3. The method as in claim 1, wherein said film is warmed and is pressed onto said base body.

\* \* \* \* \*